United States Patent [19]
Kohn et al.

[11] Patent Number: 5,320,754
[45] Date of Patent: Jun. 14, 1994

[54] PAN COMPOSITE MEMBRANES

[75] Inventors: Rachel S. Kohn, Springfield; Edward R. Kafchinski, Winfield; Tai-Shung Chung, Randolph; Brenda A. Bembry-Ross, Newark, all of N.J.

[73] Assignee: Hoechst Celanese Corp., Somerville, N.J.

[21] Appl. No.: 993,931

[22] Filed: Dec. 18, 1992

[51] Int. Cl.$^5$ .............................................. B01D 69/08
[52] U.S. Cl. ................................ 210/490; 210/500.23; 210/500.43; 210/500.39; 427/246
[58] Field of Search ................. 210/490, 500.43, 508, 210/500.23, 500.39; 55/16, 158; 264/41, 49; 427/245, 246

[56] References Cited

U.S. PATENT DOCUMENTS

| | | | |
|---|---|---|---|
| 3,851,036 | 11/1974 | Zurich | 264/182 |
| 4,409,162 | 10/1983 | Takao | 264/41 |
| 4,470,859 | 9/1984 | Benezra et al. | 210/508 X |
| 4,756,932 | 7/1988 | Puri | 427/245 X |
| 4,881,954 | 11/1989 | Bikson et al. | 55/16 |
| 4,935,141 | 6/1990 | Buck et al. | 210/500.38 |
| 4,960,519 | 10/1990 | Pasternak et al. | 210/640 |

Primary Examiner—Frank Spear
Attorney, Agent, or Firm—Joseph M. Mazzarese

[57] ABSTRACT

A novel method for making a composite separation membrane, and the product of that method. This novel method includes applying one or more perfluoroethers to the surface of a microporous fiber or film made of a polymer such as PAN, and subsequently coating that fiber or film surface with a layer of selective material. This method provides a more permeable composite membrane than would be obtained by coating a fiber or film that had not been pre-wetted with perfluoroether.

20 Claims, 1 Drawing Sheet

PAN COMPOSITE MEMBRANES

BACKGROUND OF THE INVENTION

This invention relates to the field of composite membranes, particularly those that comprise microporous polyacrylonitrile ("PAN") fiber or film.

In creating a gas or liquid separation membrane, it is desirable to have both a high rate of permeation or throughput and a high separation factor or selectivity. This combination of characteristics permits the effective separation of a relatively large volume of fluid per unit time. Large rates of permeation also allow the membrane to be operated at lower pressures, which improves cost-effectiveness.

Highly porous membranes tend to be very permeable, but do a poor job of separating fluids into their components. Less porous, dense membranes can be more selective, but at the cost of reduced throughput.

Asymmetric membranes generally have a thin, dense separation layer and a less dense, more permeable layer. These asymmetric membranes are often chosen for separation applications because they may provide a good combination of permeation and separation. Hollow fibers having a dense skin and a porous body can be used to make such membranes.

Polyacrylonitrile hollow fiber may be coated with another material that serves as a separation layer to form a useful separation membrane, but the throughput of the PAN composite membrane may be too low for practical purposes.

U.S. Pat. No. 3,851,036, issued to Tzentis, describes a method for making asymmetric hollow fibers comprising acrylonitrile polymers, which fibers may be used in dialysis cells or textiles.

A process for producing hollow polyacrylonitrile separation membranes in fibrous form is described in U.S. Pat. No. 4,409,162, issued to Takeo. In this process, a membranous product is shaped in hollow fiber form from a solution of PAN and subsequently solvent is removed to produce an asymmetric porous separation membrane.

U.S. Pat. No. 4,756,932 issued to Puri describes a process for making highly permeable coated composite hollow fiber membranes. The hollow fiber substrate is passed continuously through a polymeric coating solution and withdrawn through a coating die to form a uniform coating.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. Pat. No. 4,935,141, issued to Buck, et al., describes asymmetric composite separation membranes for use in hemodialysis. These membranes may comprise PAN.

U.S. Pat. No. 4,960,519, issued to Pasternak, et al., describes a membrane process for separation of organic liquids using a composite membrane in which polyacrylonitrile is the support layer.

SUMMARY OF THE INVENTION

The present invention comprises a novel method for making a composite separation membrane, and the product of that method. This novel method comprises applying a perfluoroether to a surface of a microporous polymer fiber or film (e.g., a PAN hollow fiber), and subsequently coating said surface with a layer of selective material, said selective material being preferentially more permeable to one fluid of a mixture of fluids than to at least one other fluid in said mixture.

It is an object of the present invention to provide a composite membrane having both good selectivity and good permeability.

It is another object of the present invention to provide a method for improving the permeability of composite membranes.

It is a further object of the present invention to provide a method for making a highly permeable microporous composite separation membrane comprising PAN.

Other objects and advantages of the present invention will be apparent to those skilled in the art from the following description and the appended claims.

DETAILED DESCRIPTION OF THE PREFERRED EMBODIMENTS

Figure 1:
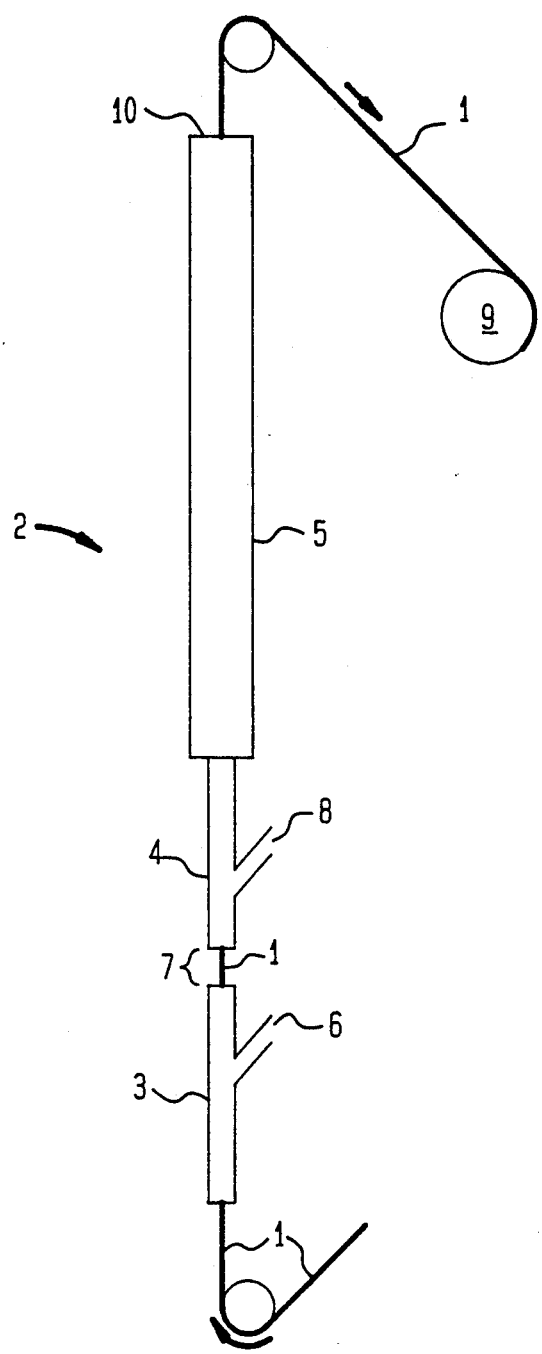
FIG. 1 illustrates one embodiment of a process and apparatus for coating PAN fiber according to this invention.

FIG. 1 illustrates a preferred embodiment of the present invention. In the illustrated embodiment, microporous PAN hollow fiber 1 travels vertically upward through a coating apparatus 2 comprising a pre-wetting section 3, a coating section 4, and a drying column 5.

The fiber 1 first passes through the pre-wetting section 3 where a perfluoroether mixture is applied to the fiber 1 through an inlet 6. The fiber 1 then passes through an air gap 7 and into the coating section 4 where a solution or dope containing a selective polymer is applied to the fiber 1 through an inlet 8.

The dope-coated fiber 1 enters the drying column 5, which is maintained at an elevated temperature to promote evaporation of the solvent from the polymer solution coating. The dried coated fiber 1 is then collected by a take-up apparatus 9. A gas, e.g. nitrogen, may be passed through the drying column 5 from the upper opening 10 thereof to facilitate drying.

The perfluoroether is applied to the fiber by any suitable method known in the art. For example, it may be slowly dripped onto the fiber, or applied with an applicator, e.g. a sponge, swab or cloth. Any perfluoroether or mixture of perfluoroethers may be used in the practice of this invention, including commercially available products such as FC-72 FLUORINERT TM Brand Electronic Liquid (sold by 3M Corporation, and containing a mixture of perfluoroethers having from 5-18 carbon atoms), or the like.

The polymer dope also may be applied by any means known in the art. The polymer may be any suitable polymer that exhibits a significant degree of preferential permeability to a first fluid in a mixture of fluids than to a second fluid in said mixture, i.e., a permselective polymer. For example, a polymer that is more permeable to oxygen than nitrogen may be applied to form a gas separation membrane suitable for air separations.

Any permselective polymer capable of being coated on a fiber or film may be used in this invention, provided that the polymer dope is not miscible with the perfluoroether. Examples of suitable permselective polymers include polyimides, such as SIXEF TM -Durene polyimide (the polymerization product of 2,2-bis[3,4- dicarboxyphenyl] hexafluoropropane dianhydride and 2,3,5,6-tetramethylphenylene diamine monomers, made by Hoechst Celanese Corporation), and the like. These permselective polymers suitably have an oxygen permeance of at least about 60 Barrers/cm and an oxygen/nitrogen separation factor of at least about 4.0 at room temperature; this separation factor is the ratio of the oxygen permeance divided by the nitrogen permeance.

The permselective polymer dope may include any suitable solvent, i.e., one in which the polymer is sufficiently soluble and which will evaporate during the drying operation. The optimum temperature and time period used for drying will depend on chemical composition and polymer concentration of the polymer dope. Preferably, the concentration of the polymer in the dope is no more than about 5%, because higher concentrations generally produce thicker coatings. The optimum dope concentration will depend on many factors, such as the polymer and solvent used, the desired coating thickness, and the fiber speed through the coating apparatus.

The preferred perfluoroethers are volatile and evaporate from the fiber at a significant rate. It is necessary, therefore, to coat the fiber with the selective polymer dope before all the perfluoroether evaporates. However, if too much perfluoroether is present on the fiber it will get into the polymer dope and make it more difficult to uniformly coat the fiber. For this reason, an air gap may be used to allow partial evaporation of the perfluoroether(s) prior to coating. Whether an air gap is needed, and the exact size of the air gap, will depend on several factors, such as the rate of application of perfluoroether, the fiber's speed, the volatility of the perfluoroether used, the temperature and humidity at which the operation occurs, and the like. Those skilled in the art will be able to determine the optimum gap and other parameters for a given system.

The presence of perfluoroether in the pores of the fiber is believed to prevent the polymer dope from deeply penetrating the pores, thus reducing the effective thickness of the polymer coating and increasing the permeability therethrough. This effect appears to depend on the relatively small pore size of the microporous PAN fiber, since in a fiber having large pores the perfluoroether would not be expected to prevent penetration of the coating into the large pores.

Preferably, the applied thickness of the selective coating is no greater than about one micron, and the apparent thickness is no greater than two microns. A ratio of apparent thickness divided by applied thickness less than about three is desirable, and a ratio less than about two is more desirable. The perfluoroether treatment of the present invention reduces the apparent thickness of the coating, and thus the ratio, presumably by reducing the penetration of the selective layer into the fiber's pores.

Apparent thickness is calculated by dividing the known permeability of a uniform layer of the selective coating material by the measured permeance of the selective layer; preferably, a correction is made for nonselective flow, i.e., the portion of the flow that passes through small holes in the material (calculated from the measured separation factor and the theoretical separation factor for the selective material). Applied thickness is calculated by dividing the applied mass of the material by its density and the area over which it is applied. Applied mass is calculated from the dope flow rate and concentration, and area is calculated from the fiber diameter and length.

A PAN fiber coated in accordance with the present invention may exhibit an oxygen permeance at 25° C. of about 400,000 Barrers/cm or more and have an oxygen/nitrogen selectivity of at least about 3.0. Oxygen permeances exceeding one million Barrers/cm have been achieved, in combination with $O_2/N_2$ selectivities greater than 3.0.

In a particularly preferred embodiment of the present invention, the PAN microporous hollow fiber is coated directly after it is spun. A continuous process can be set up wherein PAN fiber is spun and the spun fiber is fed directly into the coating apparatus of the present invention, so that both operations are in one line. However, previously spun and collected PAN fiber may also be coated according to the present invention.

The PAN fiber may be made according to any method known in the art for producing a microporous PAN fiber. Preferably, the fiber will be hollow.

Although the above embodiments have focused on PAN fiber, film may also be coated according to the present invention, either in a continuous or discontinuous process. By treating a surface of the microporous film with perfluoroether and then coating the treated surface with a permselective polymer, a composite membrane having enhanced permeability may be obtained.

The present invention is not limited to PAN composite membrane film or fiber; microporous film or fiber made of other polymers may also be used in the practice of the present invention. These films and fibers may be made according to any method known in the art, provided that the resulting film of fiber is suitably microporous.

The following Examples are presented to illustrate the present invention, but should not be construed as limiting the scope of this invention.

EXAMPLE I

PAN microporous hollow fiber having an inner diameter of 300 microns and an outer diameter of 510 microns was coated with a 2% solution of SIXEF ™-Durene polyimide in chloroform ($CHCl_3$), both with and without pre-wetting with FLUORINERT ™ FC-72 perfluoroether liquid, to examine the effect of the perfluoroether treatment. Gas separation modules were made from the coated fibers so that the separation parameters of the fibers could be evaluated. These modules were each about 20 cm long and contained 50–100 fibers. The modules contained a shell having inlet/outlet ports that allowed gas to be introduced either in the hollow interior (bore side) of the fibers or on the exterior (shell side) of the fibers.

Table I shows the results of these experiments. In some cases, identified by an asterisk (*), the coating was done in line with a PAN fiber spinning operation, i.e., the deposition of the selective coating was performed immediately after the PAN fiber was spun and dried. The PAN fiber was spun from a PAN/NMP(N-methylpyrrolidone) dope at a speed of 6 meters/min using a core solvent of 95% NMP/5% water. The spun fiber was coagulated in water at 50° C., washed with water at 60° C., and dried at 65° C., and then immediately fed into a coating apparatus as illustrated in FIG. 1.

In Table I, P/L indicates the oxygen permeance of the coated fiber in Barrers/cm, α indicates the $O_2/N_2$ selectivity of the coated fiber measured using shell-side pressure (the ratio of the oxygen permeance to the nitrogen permeance), and L indicates the coating thickness in microns for the selective layer; apparent thickness was calculated from permeance, and applied thickness was calculated from mass balance (mass of polymer applied per unit area can be calculated from the dope flow rate and concentration, and the fiber length and diameter). L Ratio indicates the ratio of the apparent thickness divided by the applied thickness. The tests were done at a temperature of 25° C. and a pressure of 20-100 psi.

TABLE I

| FC-72 | P/L | α(O₂/N₂) | Apparent L | Applied L | L Ratio |
|---|---|---|---|---|---|
| None | 62,000 | 4.2 | 12 | 0.8 | 15.0 |
| Yes | 440,000 | 3.4 | 1.8 | 0.8 | 2.25 |
| None* | 150,000 | 3.8 | 5.2 | 0.8 | 6.5 |
| Yes* | 660,000 | 3.4 | 1.2 | 0.8 | 1.5 |
| Yes* | 650,000 | 3.5 | 1.2 | 0.8 | 1.5 |

These results show that perfluoroether treatment of the fiber, prior to coating the fiber with the permselective polymer, substantially reduces the apparent coating thickness and improves the ultimate permeance of the coated fiber. This is believed to occur because the perfluoroether prevents the polyimide solution from penetrating or intruding into the pores of the fiber.

EXAMPLE II

PAN fiber was spun, coated, and tested as in Example I except that a 1% solution of SIXEF ™ -Durene polyimide in chloroform was used, reducing by roughly one-half the thickness of the polyimide coating applied to the fiber. The results are shown in Table II. The thinner polyimide coating contributed to an approximate doubling of oxygen permeance and a relatively small decrease in selectivity, as compared to the last two fibers in Table I.

TABLE II

| FC-72 | P/L | α(O₂/N₂) | Apparent L | Applied L | L Ratio |
|---|---|---|---|---|---|
| Yes* | 1,327,000 | 3.2 | 0.54 | 0.25 | 2.2 |

Many variations of the present invention not illustrated herein will occur to those skilled in the art. The present invention is not limited to the embodiments illustrated and described herein, but encompasses all the subject matter within the scope of the appended claims.

We claim:

1. A process for making a composite fiber or film for use in a fluid separation membrane comprising:
   applying a perfluoroether to a surface of a microporous fiber or film comprising a polymer; and, subsequently,
   coating said surface with a selective material, said selective material being preferentially more permeable to a first fluid in a mixture of fluids than to a second fluid in said mixture.

2. The process of claim 1 wherein said selective material comprises a polyimide.

3. The process of claim 1 wherein said selective material comprises a polyimide that is the polymerization product of 2,2-bis[3,4-dicarboxyphenyl] hexafluoropropane dianhydride and 2,3,5,6-tetramethylphenylene diamine monomers.

4. The process of claim 3 wherein said polymer is polyacrylonitrile.

5. The process of claim 1 wherein said polymer is polyacrylonitrile.

6. The process of claim 1 wherein said selective material comprises a polymer dope comprising a polymer and a solvent, said process further comprising drying said fiber after said coating operation to remove said solvent.

7. The process of claim 1 wherein a mixture of perfluoroethers is applied to said fiber surface.

8. The process of claim 1 wherein said coating step produces an applied coating no more than about one micron thick.

9. A fiber made according to the process of claim 1.

10. A fiber according to claim 9 comprising a layer of selective material having an applied thickness of no more than about one micron, wherein said fiber has an oxygen permeance of about 400,000 Barrers/cm or more and have an oxygen/nitrogen selectivity of at least about 3.0 at 25° C.

11. A film made according to the process of claim 1.

12. A film according to claim 11 comprising a layer of selective material having an applied thickness of no more than about one micron, wherein said film has an oxygen permeance of about 400,000 Barrers/cm or more and have an oxygen/nitrogen selectivity of at least about 3.0 at 25° C.

13. A process for making a composite fiber comprising:
   applying a perfluoroether to a surface of a microporous polyacrylonitrile fiber; and, subsequently,
   coating said surface with a polymer dope, said polymer dope comprising a polymer and a solvent, said polymer being preferentially more permeable to a first fluid in a mixture of fluids than to a second fluid in said mixture.

14. The process of claim 13 wherein said polymer comprises a polyimide.

15. The process of claim 13 wherein said polymer comprises a polyimide that is the polymerization product of 2,2-bis[3,4-dicarboxyphenyl] hexafluoropropane dianhydride and 2,3,5,6-tetramethylphenylene diamine monomers.

16. A fiber made by the process of claim 15.

17. A fiber made by the process of claim 13.

18. A process for making a composite fiber comprising:
   forming a hollow microporous polyacrylonitrile fiber;
   applying a perfluoroether to the outer surface of said polyacrylonitrile fiber; and, subsequently,
   coating said surface with a polymer dope, said polymer dope comprising a polymer and a solvent, said polymer being preferentially more permeable to a first fluid in a mixture of fluids than to a second fluid in said mixture.

19. The process of claim 18 wherein said polymer comprises a polyimide that is the polymerization product of 2,2-bis[3,4-dicarboxyphenyl] hexafluoropropane dianhydride and 2,3,5,6-tetramethylphenylene diamine monomers.

20. A fiber made according to the process of claim 18.

* * * * *